United States Patent [19]
Edlinger et al.

[11] Patent Number: 6,024,453
[45] Date of Patent: *Feb. 15, 2000

[54] METHOD OF RAPIDLY PRODUCING COLOR CHANGES IN AN OPTICAL LIGHT PATH

[75] Inventors: Johannes Edlinger, Frastanz, Austria; Manfred Kuster, Triesen, Liechtenstein; Cosmas Malin, Mauren, Liechtenstein; Ilse Widmann, Triesen, Liechtenstein; Peter Wierer, Bludenz, Austria

[73] Assignee: Balzers Aktiengesellshaft, Furstetum, Liechtenstein

[*] Notice: This patent is subject to a terminal disclaimer.

[21] Appl. No.: 09/246,771

[22] Filed: Feb. 8, 1999

Related U.S. Application Data

[63] Continuation of application No. 08/841,290, Apr. 29, 1997, Pat. No. 5,868,482.

[51] Int. Cl.[7] .................................................. G03B 21/14
[52] U.S. Cl. .............................................. 353/84; 348/743
[58] Field of Search ................................ 353/31, 84, 121; 348/742, 743, 771, 835; 359/578, 580, 889, 891, 892

[56] References Cited

U.S. PATENT DOCUMENTS

| | | | |
|---|---|---|---|
| 4,800,474 | 1/1989 | Bornhorst | 362/293 |
| 4,894,760 | 1/1990 | Callahan | 362/293 |
| 5,426,474 | 6/1995 | Rubstov et al. | 353/84 |
| 5,448,314 | 9/1995 | Heimbuch et al. | 348/743 |
| 5,463,433 | 10/1995 | Koo | 353/84 |
| 5,467,146 | 11/1995 | Huang et al. | 348/743 |
| 5,592,188 | 1/1997 | Doherty et al. | 348/743 |
| 5,668,572 | 9/1997 | Meyer et al. | 348/743 |
| 5,868,482 | 2/1999 | Edlinger et al. | 353/84 |

*Primary Examiner*—William Dowling
*Attorney, Agent, or Firm*—Cahill, Sutton & Thomas, P.L.C.

[57] ABSTRACT

A color wheel includes a rotatable disc-shaped carrier to which three or more planar color filter segments are secured in radial fashion about the periphery thereof. The portions of the color filter segments extending beyond the peripheral portion of the carrier form a substantially continuous translucent color ring for being inserted into, and rotated through, a light path. Each of the color filter segments is formed of a continuous sheet of material without any apertures formed therein. The disc-shaped carrier has one or more recesses, or bonding zones, formed therein to receive innermost bonding portions of the color filter segments; these recesses provide stops for aiding in the proper radial and axial positioning of the color filter segments. The bonding portions of the color filter segments are secured to the bonding zone of the disc-shaped carrier by an adhesive. A further recess can be formed in the disc-shaped carrier adjacent each bonding zone to receive the adhesive layer.

25 Claims, 2 Drawing Sheets

METHOD OF RAPIDLY PRODUCING COLOR CHANGES IN AN OPTICAL LIGHT PATH

CROSS REFERENCE TO RELATED APPLICATIONS

This application is a continuation application claiming the benefit of the earlier filing date, under 35 U.S.C. §120, of parent application Ser. No. 08/841,290, filed on Apr. 29, 1997, now U.S. Pat. No. 5,868,482, which, in turn, claims foreign priority under 35 U.S.C. §119 to prior-filed Swiss patent application No. 1091/96, filed on Apr. 30, 1996.

BACKGROUND OF THE INVENTION

1. Field of the Invention

The present invention relates to a color wheel according to the generic term of claim 1, as well as a picture generation unit according to patent claim 12.

2. Description of the Pertinent Art

Devices of the aforementioned type are used in applications where periodic color changes need to be produced in an optical system in rapid sequence such as in novel picture generation devices or display arrangements. In order to produce such color changes, color filters are inserted into the optical light path in rapid sequence. For this purpose a disc-shaped color wheel is used that is equipped with circularly arranged filter segments on the periphery that form a ring and are rotated around the central axis of the wheel. Through the rotation of the color wheel the filter segments are alternatingly inserted into the optical path and thereby the desired periodic color change is produced (The Eduard Rhein Foundation/Texas Instruments Inc., Digital Micromirror Device DMD). Because the picture generation device must be able to produce a high picture quality, the color changes must be executed very rapidly. This means that the filter segments must be moved through the light beam at very high speed. As a result large forces due to accelerations which are several hundred times larger than the acceleration g due to gravity act on the color wheel and particularly on the sensitive filter segments; for particularly high picture qualities the accelerations can exceed 1000 g. In addition the radial concentricity of the device must be highly accurate in order to achieve a long operational life of the device. Such picture generation devices must also satisfy very high brightness requirements which can only be achieved with powerful light sources. Through these powerful light sources the device is subjected to correspondingly high temperatures of up to 100° C. For these reasons the holding power and color stability of the filter segments must fulfill very demanding requirements. Broad-scale utilization in so-called low-cost display applications is only feasible if it becomes possible to produce the color wheel at very low costs despite the high quality requirements.

A color wheel with circularly arranged filter segments for use in picture generation devices is described in EP 0 615 156 A2. In this device the filter segments are mounted on a glass ring. The disadvantage of this arrangement is that the glass ring is expensive. In addition, precise radial concentricity is difficult to achieve. The glass ring produces additional light loss which impairs the economy of the overall arrangement. In →dition color wheel arrangements are known that feature fixing elements such as spokes between the segments, but also these lower the overall transmission values of the color filter rings and limit the economy.

The various features of novelty which characterize the invention are pointed out with particularity in the claims annexed to and forming a part of this disclosure and are entirely based on the Swiss Priority application No. 1091/96, filed on Apr. 30, 1996.

The purpose of the present invention is to create a device that remedies the disadvantages of the current state of the art. In particular the color wheel shall be able to satisfy the demanding optical and mechanical properties over a long operational life and be economical to manufacture.

This task is solved by the present invention based on the design according to claim 1.

SUMMARY OF THE INVENTION

The plane color filter segments are bonded on the periphery of a circular carrier in such a way that the ring-shaped transparent area between the filter segments in the rotation direction is not interrupted by materials that are optically not transparent. The color filter segments are surface bonded to the carrier in a strip-shaped zone pointing toward the axis of rotation. Surface bonding exists only in a small ring zone area toward the center of the rotation, so that a major portion of the filter segment surface, viewed radially from the axis of rotation toward the outside, remains free as a transparent, ring-shaped useful zone. Additional fixing elements that would require openings such as holes in the filter segments, can be eliminated completely. Holes in the filter segments would produce stress zones in the edge areas which under the high mechanical forces could cause breakage and are consequently not tolerable.

The circular carrier has a feature, such as a bore hole, for a motor-driven shaft that turns the color wheel with several 1000 rotations per minute. For high picture quality the picture generation device requires such high rotational speeds that centrifugal accelerations of over 300 g occur, for very high picture qualities the accelerations are within the range of 800 g to 2000 g. This requires special attention in dimensioning the color wheel with corresponding bonding zones. To achieve good speed consistency, quiet running, and a long operational life the color wheel must be balanced with great accuracy. For the preferred application, operational lives of >40,000 h MTBF are desired. The necessary balancing quality must fulfill standard G 6.3 of ISO 1940 to 1973. These values must be achieved in the assembled condition of the color wheel. This means that the wheel must be designed in such a way that simple balancing in fully assembled condition is feasible. The present design allows this in that the balancing is achieved by removing material from the disc-shaped carrier material, preferably in the form of a recess, where this recess is preferably drilled out. This recess or bore on the carrier disc should be in the form of a blind hole and not puncture the carrier. These recesses may also be implemented prior to the balancing procedure. The balancing consists then in carefully filling them with a material. An adhesive substance or cement is especially well suited for that purpose. The carrier disc can be made of plastic or metal. Particularly suited, however, are light metals such as aluminum or aluminum alloys. The color wheel is driven by electrical motors, in particular drive motors of the type that are used for hard disks.

The color filters consist of interference film filters. These are designed from alternating films in the known manner, such as from $TiO_2/SiO_2$ and are dimensioned in accordance with the required filter characteristic. Due to the required high optical stability under fluctuating temperatures and humidity, dense films are preferably used. These can preferably be produced by so-called sputter coating processes.

For a color wheel at least two different segments are normally required. Often also three-color systems are used in which the color filter ring consists of three consecutively arranged filter segments, for example, the colors red, green and blue. A color wheel that is particularly favorable for the color perception of the picture generation device consists of an arrangement with four color segments, where two mutually opposite segments have the same color, for example, red and the two other segments have different colors, for example blue and green. The filter characteristic of the filter segments must be extremely stable under fluctuating temperature and humidity conditions. Within a temperature range of 10° C. to 100° C. and a range of 0% to 90% relative humidity the overall stability of the filter characteristic must preferably be within a range of less than 5 nm shift. Especially preferred for the application in picture generation devices are filters with shIlts of less than 1 nm within the above ranges. Such high filter qualities can be economically produced with the aforementioned cathode sputtering systems such as magnetron sputtering. Particularly economical sputtering processes, however, are processes as they are known under the term "Intramode", corresponding to U.S. Pat. No. 5,292,417 which represents an integral part of this application, as well as with the reactive chopper sputtering system with imagnetron as it is known, for example, from EP 0 564 789. In the chopper sputtering process the magnetron sputtering source is used in switched mode or an additional, switched voltage is superposed on the magnetron discharge within the frequency range of several 100 Hz to several 100 kHz, where a metallic target is sputtered by adding a reactive gas so that the corresponding dielectric film is deposited on the substrate. Instead of switching or chopping also coupling or superposition of a medium frequency is feasible through which economical deposition of dielectric films with the aid of magnetron sputtering becomes possible as is the case when chopping is used.

In order to achieve excellent bonding of the filter segments with the carrier disc, a recess can be made in the bonding zone of the carrier disc where the recess should correspond to the area to be bonded and be able to accept the adhesive in a concentric circular zone. The recess should preferably correspond to the optimum adhesive film thickness which for suitable adhesives is in the range of 50 to 200 p-m. Suitable for the demanding application requirements is an epoxy adhesive, preferably type DP460 made by the company 3M. The recess is to be designed in such a way that lobes or standoffs exist at the inner and outer diameter of the recess which represent accurate filter segment seating surfaces in the rotation plane. These seating surfaces with the ring-shaped recesses are preferably offset relative to the disc-shaped carrier surface in such a way that the filter segments in their cross-section are approximately centric to the disc cross-section. The recess with its radial shoulder can be designed in such a way that it also serves as a radial stop shoulder for positioning the filter segments. This design greatly simplifies the mounting of filter segments prior to bonding, that is, the filter segments need to be positioned only flush against each other to the axial and radial stops on the carrier disc and subsequently fixed by hardening the adhesive. These mounting steps can be further simplified by pressing a retaining ring, for example made of plastic such as polymer, on the filter segments in the area of the carrier recess so that the segments are fixed relative to the bonding zone. The entire arrangement comprising only a few parts can, therefore, be installed easily and accurately and can subsequently be accurately balanced as described below. This allows the individual parts to be produced with greater admissible dimension tolerances which enhances the manufacturing economy.

For electronically monitoring the rotational position of the color wheel with its color filters, a marker or a time index mark must be affixed to the color wheel. It can be simply mounted on the carrier disc, preferably on the aforementioned retaining ring which also serves as a mounting aid. A color wheel according to the invention is preferably used in a picture generation device with a light source whose light is directed through the color segments of the rotating, motor-driven color wheel and which is subsequently aimed at a picture generation device that consists of a matrix of controlled or switched light control elements through which the picture is created on a screen by means of optical projection. To achieve good picture quality these light control elements must have switching times of <10 ms. Particularly suited as picture generation devices are arrangements comprising many small, controllable mirrors, that is, on the basis of reflection. Preferred are reflective picture generation devices type "Digital Mirror Device". With the color wheel according to the invention which exploits the high switching frequencies of said picture generation device, economical production of picture generation devices is possible which allow large display sizes with high luminosity and high quality. The invention is subsequently explained with the aid of the illustrated examples FIG. 1 to FIG. 2.

DETAILED DESCRIPTION OF THE PREFERRED EMBODIMENTS

Figure 1:
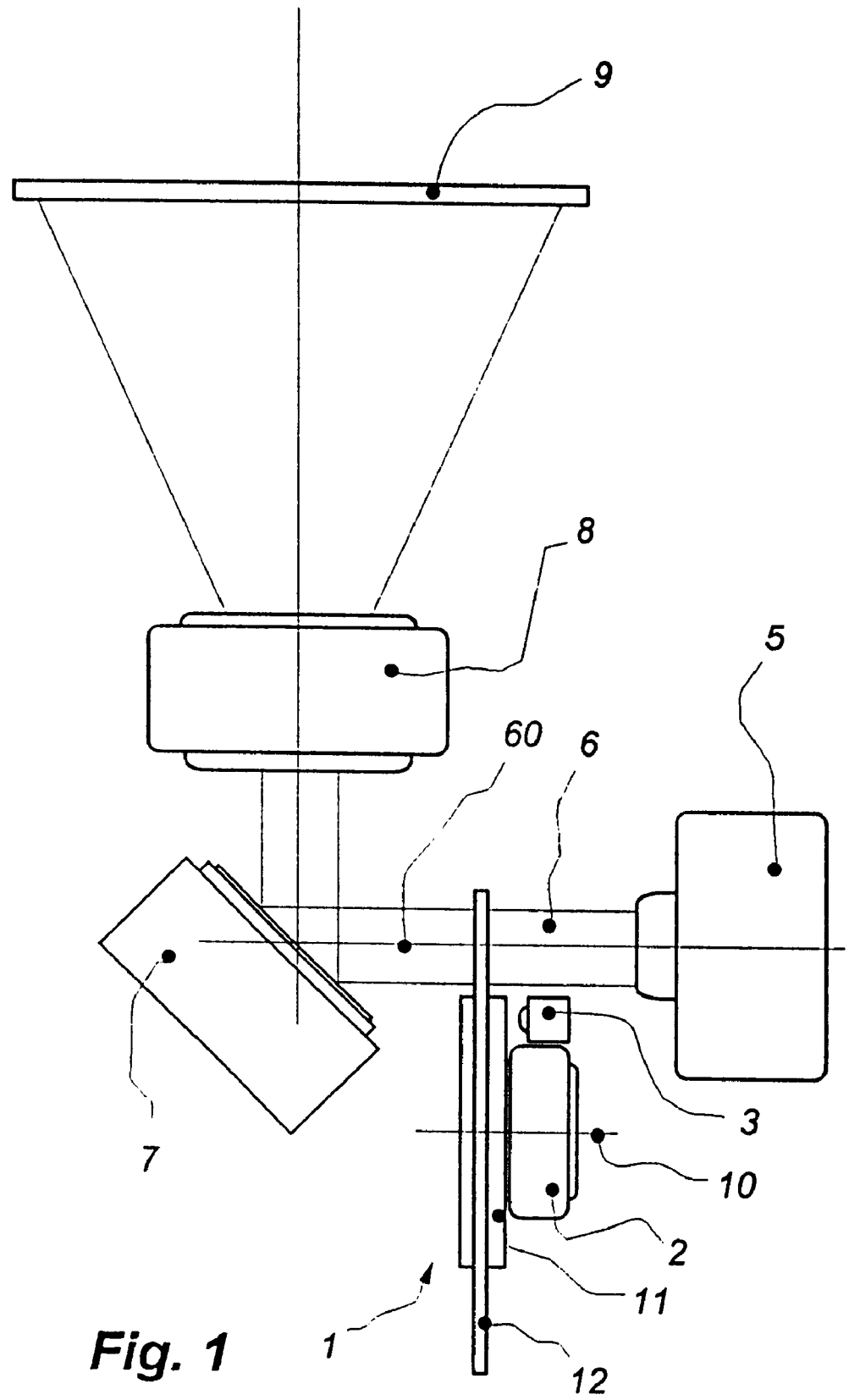
FIG. 1 is a general view of a novel display with a device.

FIG. 1 represents a general view of a novel display with a device. It comprises a color wheel 1 that is coupled to a motor 2 and a rotational position sensor 3 on a carrier 24. Color wheel 1 features a carrier 11 to which the filter segments 12 are fixed. Item 5 designates a light source from which a light beam 6 with the optical axis 60 emerges. Light beam 6 passes through the filter segments 12 and impinges on picture generation device 7. The picture produced by the picture generation device is projected on a screen 9 by means of an optical protection system 8. Motor 2 puts the color wheel 1 in motion about rotational axis 10, causing the filter segments 12 to be alternatingly inserted into the light beam 6. The momentary position of the filter segments 12 can be determined with the rotational position sensor 3. In accordance with the color of the filter segment 12a–12c located in the light beam a picture assigned to this color is produced by the picture generation device 7. The rotational speed of the color wheel consequently corresponds to the picture refresh rate and is in the range of several thousand revolutions per minute. The centripetal forces which act on the filter segments can be a thousand times greater than the gravitational force.

As high color fidelity is desired, the filter characteristics of the filter segments 12 are very complex. The size of the screen 9 is also considerable. In order to achieve adequate contrast in a bright environment, a powerful lamp with correspondingly high heat radiation is used in light source 5. For this reason temperatures of up to 100° C. can occur within the area of the device. Due to the heat of radiation emitted by light source 5, the thermal load on the filter segments 12 is even higher. To achieve maximum color stability throughout the entire operational life these filter segments feature filter films 17 that are preferably deposited as stable dielectric films without columnar structures. Besides offering a long life and temperature resistance, such films also achieve very high temperature stability. Unwanted shifts in the spectral curve of less than 1 nm within a range of 10–100° C. are achievable. In addition such films have excellent bonding strength to the substrate. The latter is particularly important if adhesives are used on the films.

Figure 2A:
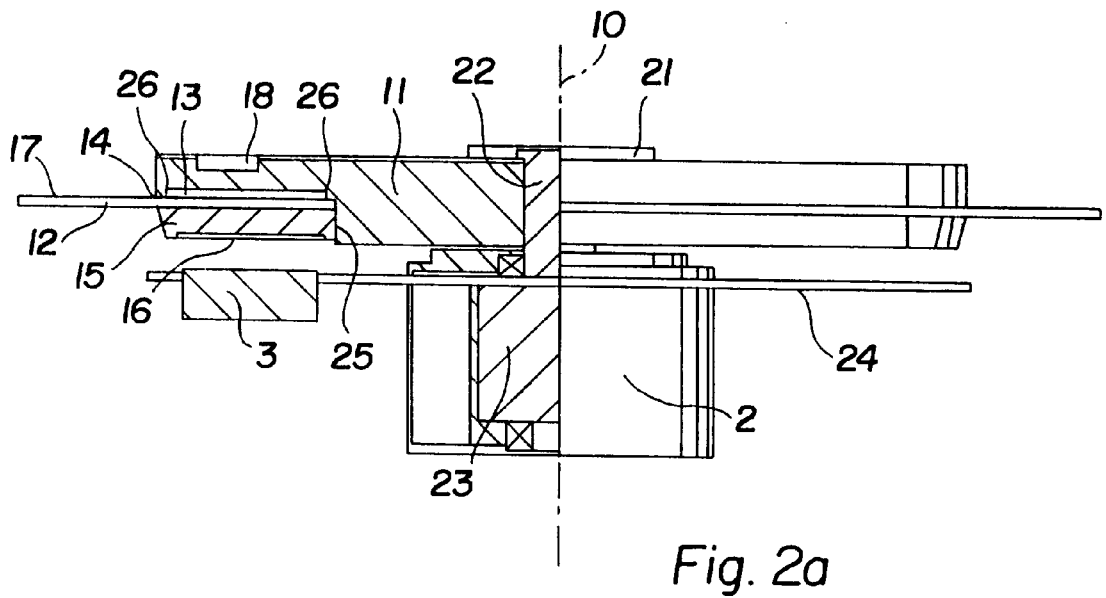
FIG. 2a is a partial cross-section representing a possible design of a color wheel.
Figure 2B:
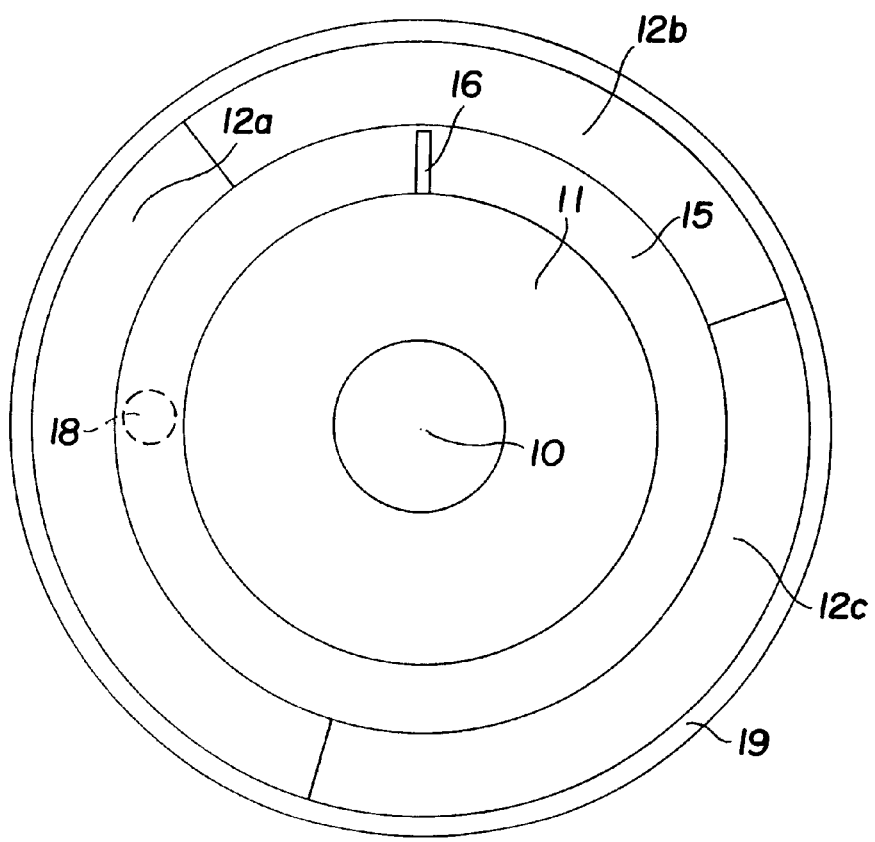
FIG. 2b is a top view of a color wheel.

FIG. 2 illustrates a design version of the device in a partial cross-section in FIG. 2a and as a top view in FIG. 2b. The carrier 11 is fixed to a rotor 23 of the motor 2 by means of holding device 21 which is operatively connected by the shaft 22 with the rotor 23. The filter segments 12 are bonded with an adhesive film 13 to the carrier 11 with a recess relative to the surface of the latter. This recess in the edge area of the carrier is designed in such a way that the filter segments can be accurately positioned radially 25 and axially 26 against the stops on the carrier. The film thickness of the adhesive layer 13 is determined by a spacer 14. The spacer 14 can be, for example, a recess in the surface in the bonding area. The bonding area is covered by a ring 15. This ring 15 also serves as a position marker 16 holder for the rotational position sensor 3. Due to the tolerances in the mechanical design of the color wheel and the attachment of the carrier 11 to the rotor 23, the device will be out of balance. These imbalances are compensated by a balancing device 18. The balancing device may consist, for example, and preferably of a recess such as a bore in carrier 11. If the carrier is fabricated from aluminum or aluminum alloy, a balancing bore 18 is usually made in the outer edge area of carrier 11 and typically has a diameter of 5–10 mm and a depth up to 3 mm. The preferred overall diameter for color wheels used in picture generation devices is in the range of 75 to 130 mm. The illustrated example has an overall diameter of 108 mm where the carrier diameter is 81 mm. The width of the bonding ring zone is preferably in the range of 3 to 10 mm. As the connection between the rotor 23 and carrier 11 has a significant influence on the radial concentricity of the device, the device is balanced after carrier 11 has been mounted on the rotor 23. To minimize the imbalances the carrier is designed as an integral part of rotor 23. Therefore, if carrier 11 and rotor 23 or connecting drive shaft 22 are all made of one piece, then they are particularly economical to manufacture. In this case the segments 12 are preferentially mounted on carrier 11, 22, 23 on the side opposite of the motor 2.

For applications with less critical requirements the filter segments 12 can, be fixed by means of an elastic material that is clamped between ring 15 and filter segment 12. As an additional protection device a protection ring 19 can be arranged on the outer edge of the filter segments 12.

We claim:

1. A method of rapidly producing color changes in an optical light path, said method comprising the steps of:
   a. projecting a light beam along an optical light path;
   b. providing a disc-shaped carrier having a central axis and an outer periphery, the disc-shaped carrier having a first surface that includes a bonding zone which extends to the outer periphery of the disc-shaped carrier;
   c. mounting the disc-shaped carrier for rotation about its central axis;
   d. providing a plurality of planar color filter segments, each of said planar color filter segments including a bonding portion for lying adjacent the bonding zone of the disc-shaped carrier, each of the planar color filter segments being translucent and forming a continuous sheet of material without any apertures formed therein; and
   e. securing the bonding portion of each planar color filter segment to the bonding zone of the disc-shaped carrier using an epoxy glue adhesive to form a color wheel, each such planar color filter segment being aligned radially to the central axis of the disc-shaped carrier, each of the planar color filter segments extending radially beyond the outer periphery of the disc-shaped carrier for being sequentially inserted into the optical light path as the disc-shaped carrier is rotated, the planar color filter segments forming a ring-shaped translucent area that is arranged concentrically about the central axis of the disc-shaped carrier the ring-shaped translucent area being adapted to extend into the optical light path and being continuously translucent relative to the optical light path as the disc-shaped carrier is rotated, the epoxy glue adhesive being sufficiently strong to allow the color wheel to withstand centrifugal accelerations of over 300 g, wherein g designates acceleration due to gravity; and
   f. rapidly rotating the disc-shaped carrier about its central axis to rapidly produce color changes in the optical light path.

2. The method of claim 1 wherein said step of rapidly rotating the disc-shaped carrier includes the step of rotating the disc-shaped carrier at a rate of at least two-thousand revolutions per minute.

3. The method of claim 1 wherein said step of providing a plurality of planar color filter segments includes the step of providing four such planar color filter segments, wherein two of such planar color filter segments are of the same color as each other, and wherein said step of securing the bonding portion of the plurality of planar color filter segments to the bonding zone of the disc-shaped carrier includes the step of arranging the two same-colored filter segments opposite one another.

4. The method of claim 1 further including the steps of:
   a. forming at least one blind hole in the disc-shaped carrier; and
   b. applying an adhesive substance within the at least one blind hole for rotationally balancing the color wheel.

5. The method of claim 1 wherein the step of providing the disc-shaped carrier includes the step of forming the disc-shaped carrier integral with a drive shaft extending along the central axis of the disc-shaped carrier, and wherein said step of rapidly rotating the disc-shaped carrier about its central axis includes the steps of coupling the drive shaft to a rotor of a motor and operating the motor.

6. The method of claim 1 wherein said step of providing each of the plurality of planar color filter segments includes the step of coating an interference filter to a glass plate, the filter characteristic of each such interference filter being stable within the temperature range of 10° C. to 100° C.

7. A method of rapidly producing color changes in an optical light path, said method comprising the steps of:
   a. projecting a light beam along an optical path;
   b. providing a disc-shaped carrier having a central axis and an outer periphery, the disc-shaped carrier having a first surface that includes a bonding zone which extends to the outer periphery of the disc-shaped carrier;
   c. mounting the disc-shaped carrier for rotation about its central axis;
   d. providing a plurality of planar color filter segments, each of said planar color filter segments including a bonding portion for lying adjacent the bonding zone of the disc-shaped carrier, each of the planar color filter segments being translucent and forming a continuous sheet of material without any apertures formed therein; and e. securing the bonding portion of each planar color filter segment to the bonding zone of the disc-shaped carrier with an adhesive to form a color wheel, each such planar color filter segment being aligned radially to the central axis of the disc-shaped carrier, each of the planar color filter segments extending radially beyond the outer periphery of the disc-shaped carrier for being sequentially inserted into the optical light path as the disc-shaped carrier is rotated, the planar color filter segments forming a ring-shaped translucent area that is arranged concentrically about the central axis of the disc-shaped carrier, the ring-shaped translucent area being adapted to extend into the optical light path and being continuously translucent relative to the optical light path as the disc-shaped carrier is rotated; and f. rotating the disc-shaped carrier about its central axis at a rate of at least two-thousand revolutions per minute to rapidly produce color changes in the optical light path.

8. The method recited by claim 7 including the further steps of:

a. forming a first recess in the disc-shaped carrier extending in a ring shape proximate the periphery of the disc-shaped carrier to provide the bonding zone; and b. applying a layer of adhesive within the first recess to secure the bonding portion of each planar color filter segment to the bonding zone of the disc-shaped carrier.

9. The method recited by claim 8 wherein the steps of forming the first recess and applying the layer of adhesive are performed in a manner by which the depth of the first recess and the thickness of the layer of adhesive are substantially equal.

10. The method recited by claim 9 wherein the depth of the first recess, and the thickness of the layer of adhesive, each lie substantially within the range of 50 to 200 um.

11. The method recited by claim 8 wherein the step of applying a layer of adhesive includes the step of applying an epoxy glue.

12. The method recited by claim 8 wherein the step of applying a layer of adhesive includes the step of applying epoxy glue of the type DP460 epoxy glue commercially available from the 3M Company.

13. The method recited by claim 7 including the further steps of:

a. forming a recess in the disc-shaped carrier extending in a ring shape proximate the periphery of the disc-shaped carrier to provide the bonding zone;

b. forming at least one radial stop and at least one axial stop within the recess;

c. applying a layer of adhesive within the recess to secure the bonding portion of each planar color filter segment to the bonding zone of the disc-shaped carrier; and d. engaging each of the planar color filter segments with at least one radial stop and at least one axial stop of the recess for positioning each such planar color filter segment upon the disc-shaped carrier.

14. The method recited by claim 7 including the further step of arranging a retaining ring on the side of the planar color filter segments lying opposite the layer of adhesive to aid in mounting the planar color filter segments to the disc-shaped carrier.

15. The method recited by claim 14 including the step of forming a time index marker on the retaining ring.

16. The method recited by claim 7 wherein the step of providing a plurality of planar color filter segments includes providing at least two different-colored segments.

17. The method recited by claim 16 wherein the step of providing a plurality of planar color filter segments includes providing four such planar filter color segments, two of such segments being of the same color as each other, and arranging the two same-colored segments oppositely one another.

18. The method recited by claim 7 further including the step of rotationally balancing the color wheel.

19. The method recited by claim 18 wherein the step of rotationally balancing the color wheel includes the step of rotationally balancing the color wheel with a degree of imbalance better than according to G6.3 quality according to ISO 1940–1973.

20. The method recited by claim 18 wherein the step of rotationally balancing the color wheel includes the steps of:

a. forming at least one blind hole in the disc-shaped carrier; and b. applying an adhesive substance within the at least one blind hole for rotationally balancing the color wheel.

21. The method recited by claim 7 wherein the step of providing a plurality of planar color filter segments includes the step of coating a plurality of glass plates with an interference filter, the filter characteristic of each such interference filter being stable within the temperature range of 10° C. to 100° C. and stable within the humidity range of 0% to 90% r.h. and where the overall stability of the filter characteristic exhibits a shift of less than 5 nm, referably less than 1 nm.

22. The method recited by claim 7 wherein the step of securing the bonding portion of each planar color filter segment to the bonding zone of the disc-shaped carrier with an adhesive is performed in a manner that allows the resulting color wheel to withstand centrifugal accelerations of over 300 g, wherein g designates acceleration due to gravity.

23. The method recited by claim 7 including the step of coupling the disc-shaped carrier to a rotor of a motor by a drive shaft.

24. The method recited by claim 23 including the step of manufacturing the disc-shaped carrier, the drive shaft, and the rotor as one integral piece.

25. The method recited by claim 18 wherein the step of rotationally balancing the color wheel includes the step of forming at least one blind hole in the disc-shaped carrier.

* * * * *